(12) United States Patent
Sankai (10) Patent No.: US 11,335,083 B2
(45) Date of Patent: May 17, 2022

(54) OBJECT IDENTIFICATION DEVICE AND OBJECT IDENTIFICATION METHOD

(71) Applicants: CYBERDYNE INC., Ibaraki (JP); University of Tsukuba, Ibaraki (JP)

(72) Inventor: Yoshiyuki Sankai, Ibaraki (JP)

(73) Assignees: CYBERDYNE INC., Ibaraki (JP); University of Tsukuba, Ibaraki (JP)

( * ) Notice: Subject to any disclaimer, the term of this patent is extended or adjusted under 35 U.S.C. 154(b) by 62 days.

(21) Appl. No.: 16/966,603

(22) PCT Filed: Jan. 11, 2019

(86) PCT No.: PCT/JP2019/000788
§ 371 (c)(1),
(2) Date: Jul. 31, 2020

(87) PCT Pub. No.: WO2019/150920
PCT Pub. Date: Aug. 8, 2019

(65) Prior Publication Data
US 2021/0056339 A1  Feb. 25, 2021

(30) Foreign Application Priority Data
Jan. 31, 2018 (JP) .............................. JP2018-016035

(51) Int. Cl.
*G06V 10/44* (2022.01)
*G01N 23/04* (2018.01)
(Continued)

(52) U.S. Cl.
CPC ............. *G06V 10/44* (2022.01); *G01N 23/04* (2013.01); *G01N 23/083* (2013.01);
(Continued)

(58) Field of Classification Search
CPC ................. G01N 23/04; G01N 23/083; G01N 2223/401; G01N 2223/408;
(Continued)

(56) References Cited

U.S. PATENT DOCUMENTS 6,324,253 B1 * 11/2001 Yuyama ................. G01N 23/04
378/57
6,347,132 B1 * 2/2002 Annis .................... G01N 23/04
378/57
(Continued)

FOREIGN PATENT DOCUMENTS

EP   2750077 A2    7/2014
JP   10208046 A *  8/1998
(Continued)

OTHER PUBLICATIONS

International Search Report for related PCT App No. PCT/JP2019/000788 dated Feb. 19, 2019, 5 pgs.
(Continued)

*Primary Examiner* — Brenda C Bernardi
(74) *Attorney, Agent, or Firm* — Procopio, Cory, Hargreaves & Savitch LLP (57) ABSTRACT

Provided are an object identification device and an object identification method in which objects can be easily identified. The object identification device is provided with a pixel group extraction unit which scans, in units of the image area, an X-ray transferred image obtained from an imaging unit which performs X-ray imaging to an item to be inspected that is supplied, and extracts a plurality of pixel groups including characteristics of a shape of at least a part of the item to be inspected, and a determination unit which determines, with regard to the plurality of pixel groups extracted by the pixel group extraction unit, whether the item to be inspected corresponds to the object by executing all of the series of mappings related to an angle of an n direction by (Continued)

using each of the weight parameters based on the data group read from the memory unit.

12 Claims, 7 Drawing Sheets

(51) Int. Cl.
| | | |
|---|---|---|
| *G01N 23/083* | (2018.01) | |
| *G06K 9/62* | (2022.01) | |
| *G06T 11/00* | (2006.01) | |
| *G08B 3/10* | (2006.01) | |
| *G08B 5/36* | (2006.01) | |

(52) U.S. Cl.
CPC ......... *G06K 9/6228* (2013.01); *G06K 9/6289* (2013.01); *G06T 11/001* (2013.01); *G01N 2223/401* (2013.01); *G01N 2223/408* (2013.01); *G06V 2201/05* (2022.01); *G08B 3/10* (2013.01); *G08B 5/36* (2013.01)

(58) Field of Classification Search
CPC ............. G06K 9/00201; G06K 9/6228; G06K 9/4604; G06K 9/6289; G06K 9/4628; G06K 9/6271; G06K 9/00771; G06K 2209/09; G06T 11/001; G01V 5/0016; G08B 3/10; G08B 5/36
See application file for complete search history.

(56) References Cited

U.S. PATENT DOCUMENTS

| | | | |
|---|---|---|---|
| 2006/0078085 A1* | 4/2006 | Zanker | H04N 13/239 378/57 |
| 2007/0133744 A1* | 6/2007 | Bijjani | A61B 6/032 378/57 |
| 2008/0260096 A1* | 10/2008 | Sommer | G01V 5/0016 378/57 |
| 2009/0175412 A1* | 7/2009 | Grodzins | G01T 3/06 378/57 |
| 2013/0101172 A1 | 4/2013 | Parikh et al. | |
| 2015/0332448 A1* | 11/2015 | Zhang | G06T 7/0004 382/103 |
| 2018/0195977 A1* | 7/2018 | Wang | G06T 5/50 |

FOREIGN PATENT DOCUMENTS

| | | |
|---|---|---|
| JP | 2002257751 A | 9/2002 |
| JP | 2014525594 A | 9/2014 |

OTHER PUBLICATIONS

European Patent Office, Extended European Search Report, Application No. 19747528.8-1207, dated Sep. 24, 2021, in 12 pages.

* cited by examiner

OBJECT IDENTIFICATION DEVICE AND OBJECT IDENTIFICATION METHOD

CROSS-REFERENCE TO RELATED APPLICATIONS

This application is a U.S. National Stage entry of PCT Application No: PCT/JP2019/000788 filed Jan. 11, 2019, which claims priority to Japanese Patent Application No. 2018-016035 filed Jan. 31, 2018, the contents of which are incorporated herein by reference.

TECHNICAL FIELD

The present invention relates to an object identification device, and can be suitably applied to an object identification device and an object identification method which are used, for example, in X-ray baggage inspection.

BACKGROUND ART

Conventionally, in the baggage inspection conducted in airports and event sites, a gray scale image indicating the transmission amount of X-rays or a color image in which the material is determined and color is applied for each type of material is displayed on a display unit, and the existence of a dangerous object is confirmed manually.

In order to determine whether a dangerous object is included in the foregoing image, a highly trained inspector is required. Moreover, numerous inspectors need to be procured. Thus, the automation of discovering dangerous objects is being pursued in order to suppress the burden of inspectors and reduce the number of required personnel as much as possible.

In recent years, disclosed is a system of performing image processing to the images that were captured by causing the baggage to undergo high-speed scanning, and deeming that the baggage has passed the inspection when an item of a specific shape is not included in the image and deeming that the baggage has failed the inspection when an item of a specific shape is included in the image (refer to PTL 1).

Moreover, disclosed is a system of calculating the characteristics of the contents of an object from a plurality of X-ray scanned images, detecting and analyzing the object by comparing it with a stored characteristics set (combination of physical characteristics including attenuation (transmission), texture, atomic number, size and shape obtained from a plurality of images) registered in a database in advance, and determining a match with the contents of the object or the existence of a threat (refer to PTL 2).

CITATION LIST

Patent Literature

[PTL 1] Japanese Unexamined Patent Application Publication No. 2002-257751
[PTL 2] Japanese Unexamined Patent Application Publication (Translation of PCT Application) No. 2014-525594

SUMMARY OF THE INVENTION

Problems to be Solved by the Invention

Nevertheless, while template matching is performed with the system described in PTL 1, since it is necessary to scan the template image with the input image, calculate the similarity at the respective positions on the input image, and detect the position with the highest similarity (or similarity of a threshold or higher) in template matching, image processing needs to be performed to both the template image and the input image. Moreover, with the system described in PTL 2, there is a problem in that manifest data needs to be prepared.

Meanwhile, during baggage inspection, it is difficult for an inspector to accurately determine whether or not the item to be inspected corresponds to a dangerous object only through the visual confirmation of the X-ray transferred image. In effect, the types of dangerous objects are wide-ranging from sharp objects, lighters and bombs, and it would be extremely difficult for an inspector to visually determine a high-risk object, which is not yet known, only based on its shape, and the inspector will need to pick up the object if he/she has any doubts regarding the safety of that object. Thus, it is desirable to recognize in advance all objects that could be included in the baggage, and determine whether the item to be inspected corresponds to the recognized object during the baggage inspection.

The present invention was devised in view of the foregoing points, and an object of this invention is to propose an object identification device and an object identification method in which objects can be easily identified irrespective of the X-ray imaging direction.

Means to Solve the Problems

In order to achieve the foregoing object, the present invention provides an object identification device which identifies a specific object from an X-ray transferred image, comprising: a memory unit which stores a data group which is obtained, with regard to mapping function elements which execute multi-input single-output mappings of performing, and outputting, nonlinear threshold processing to a sum obtained by inputting a plurality of pixel groups configuring an image area including characteristics of a shape of at least a part of the object for each of the image groups and multiplying each weight parameter assigned thereto among a plurality of X-ray transferred images generated by X-ray imaging the object from an angle of an arbitrary i direction (integer which satisfies $1 \leq i \leq n$), by executing the series of mappings until the mappings converge to a final single mapping function element for deciding whether it corresponds to the object while interconnecting inputs/outputs of the mapping function elements, and thereafter respectively optimizing all of the weight parameters based on an output of the obtained single mapping function element; a pixel group extraction unit which scans, in units of the image area, an X-ray transferred image obtained from an imaging unit which performs X-ray imaging to an item to be inspected that is supplied, and extracts a plurality of pixel groups including characteristics of a shape of at least a part of the item to be inspected; and a determination unit which determines, with regard to the plurality of pixel groups extracted by the pixel group extraction unit, whether the item to be inspected corresponds to the object by executing all of the series of mappings related to an angle of an n direction by using each of the weight parameters based on the data group read from the memory unit.

Consequently, during the actual X-ray imaging of the item to be inspected, there is no need to compare the item to be inspected with standard data such as the template image that is registered in a database in advance, and the object can be easily identified irrespective of the X-ray imaging direction merely by performing computation using the weight parameters read from a memory unit (memory) if the item to be inspected corresponds to an object that was stored in advance.

Moreover, in the present invention, the determination unit determines whether the item to be inspected corresponds to the object based on a result of executing the series of mappings regarding an X-ray transferred image obtained by imaging the object from an angle of an arbitrary i direction, an X-ray transferred image obtained from an angle of an (i−k) direction (integer which satisfies 1≤k<i), and an X-ray transferred image obtained from an angle of an (i+k) direction.

Consequently, since the correlation of X-ray transferred images from a nearly approximate angular direction is high, the object can be identified easily and with high precision by using the weight parameters of these X-ray transferred images.

Furthermore, in the present invention, the determination unit determines whether the item to be inspected corresponds to the object by using the weight parameters based on a plurality of pixel groups representing a most notable characteristic site for identifying the object among sites of the object and executing all of the series of mappings upon executing the series of mappings for an X-ray transferred image obtained by imaging the object from an angle of an arbitrary i direction.

Consequently, the object can be identified easily only from the most notable characteristic site for identifying the object (for instance, pen point of a fountain pen) without having to target the entire object.

Furthermore, in the present invention, the object identification device further comprises a display unit which displays a screen of an X-ray transferred image that was subject to X-ray imaging of the imaging unit, wherein, when the determination unit determines that the item to be inspected corresponds to the object, the display unit colors the item to be inspected in an identifiable manner within the X-ray transferred image displayed on the display unit.

Consequently, when the item to be inspected corresponds to the object, the inspector can easily recognize the item to be inspected from the overall image by displaying only the item to be inspected in a specific color.

Furthermore, in the present invention, with regard to the object, any object which corresponds to a dangerous object is registered in the memory unit in advance, and the object identification device further comprises: a warning unit which issues a warning by outputting sound and/or emitting light circumferentially when the determination unit determines that the item to be inspected corresponds to the object and additionally determines that the object corresponds to the dangerous object stored in the memory unit.

Consequently, when the item to be inspected corresponds to an object that has been registered as a dangerous object, the inspector can easily recognize the dangerous object by issuing a warning by outputting sound and/or emitting light circumferentially.

Furthermore, in the present invention, the object identification device further comprises a display processing unit which displays the item to be inspected within the X-ray transferred image displayed on the display unit in a predetermined display color and a display pattern together with, or in substitute for, the warning issued by the warning unit.

Consequently, when the item to be inspected corresponds to an object that has been registered as a dangerous object, it is possible to reduce the risk of the inspector overlooking the existence of a dangerous object by displaying a warning on the screen which enables the inspector to notably identify such dangerous object from other objects.

The present invention additionally provides an object identification method which identifies a specific object from an X-ray transferred image, comprising: a first step of storing a data group which is obtained, with regard to mapping function elements which execute multi-input single-output mappings of performing, and outputting, non-linear threshold processing to a sum obtained by inputting a plurality of pixel groups configuring an image area including characteristics of a shape of at least a part of the object for each of the image groups and multiplying each weight parameter assigned thereto among a plurality of X-ray transferred images generated by X-ray imaging the object from an angle of an arbitrary i direction (integer which satisfies 1≤i≤n), by executing the series of mappings until the mappings converge to a final single mapping function element for deciding whether it corresponds to the object while interconnecting inputs/outputs of the mapping function elements, and thereafter respectively optimizing all of the weight parameters based on an output of the obtained single mapping function element; a second step of scanning, in units of the image area, an X-ray transferred image obtained from an imaging unit which performs X-ray imaging to an item to be inspected that is supplied, and extracting a plurality of pixel groups including characteristics of a shape of at least a part of the item to be inspected; and a third step of determining, with regard to the plurality of pixel groups that were extracted, whether the item to be inspected corresponds to the object by executing all of the series of mappings related to an angle of an n direction by using each of the weight parameters based on the data group stored in the first step.

Consequently, during the actual X-ray imaging of the item to be inspected, there is no need to compare the item to be inspected with standard data such as the template image that is registered in a database in advance, and the object can be easily identified irrespective of the X-ray imaging direction merely by performing computation using the weight parameters stored in the first step if the item to be inspected corresponds to an object that was stored in advance.

Advantageous Effects of the Invention

According to the present invention, objects can be easily identified irrespective of the X-ray imaging direction.

DESCRIPTION OF EMBODIMENTS

An embodiment of the present invention is now explained in detail with reference to the appended drawings.

(1) First Embodiment

Figure 1:
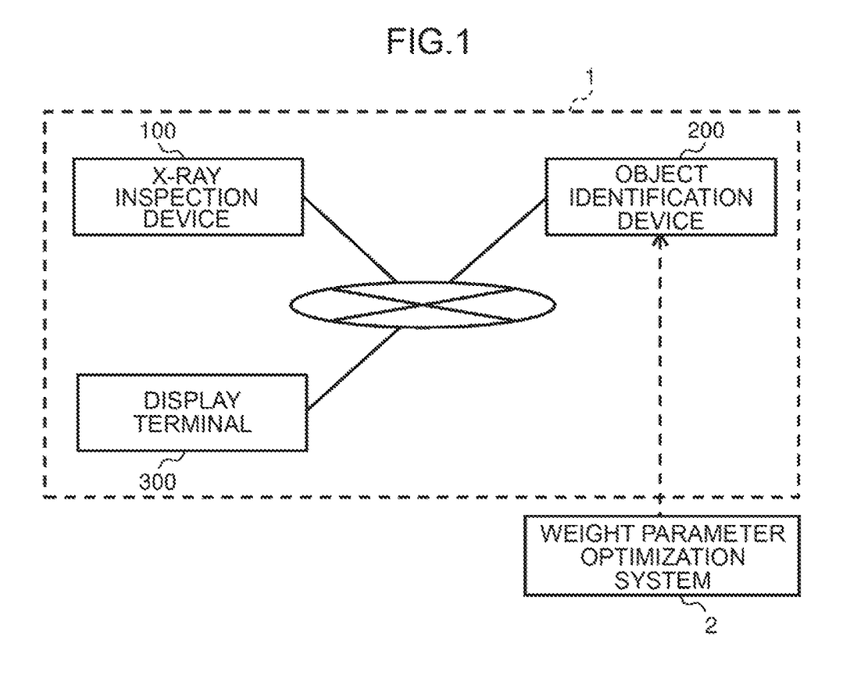
FIG. 1 is a diagram showing an example of the configuration of the object identification system according to the first embodiment.

In FIG. 1, reference numeral 1 shows the overall object identification system according to the first embodiment. The object identification system 1 stores the weight parameters which were optimized with the weight parameter optimization system 2 shown in FIG. 6 described later, and identifies (determines) what kind of object (item to be inspected) is included in an inspection item such as baggage based on the foregoing weight parameters, and the X-ray transferred image which was obtained by the inspection item being irradiated with X-rays.

More specifically, the object identification system 1 is configured by including an X-ray inspection device 100, an object identification device 200, and a display terminal 300.

The X-ray inspection device 100 is a device that is broadly used as a baggage X-ray inspection device for use in baggage inspection in security check points of airports or ports, and in event sites. A predetermined number of (one or more) X-ray inspection devices 100 are installed at the site where baggage inspection is performed.

For example, the X-ray inspection device 100 comprises an X-ray device body which includes an X-ray source for irradiating (emitting) X-rays and an X-ray detector for measuring the transmission amount of X-rays, and a computer which is used for inputting/outputting data. The X-ray inspection device 100 captures the X-ray transferred image (X-ray imaging) of the baggage supplied by the drive mechanism, and sends the X-ray transferred image to the object identification device 200. Here, the X-ray detector is an example of the imaging unit and comprises, for example, a scintillator, a photodiode and the like, and, with the X-ray detector, the X-rays used for irradiating the baggage are converted into light with the scintillator after passing through the inspection item, the converted light is detected with the photodiode, and an image is thereby acquired.

Furthermore, with the X-ray inspection device 100, one X-ray source is placed so that the X-rays can be irradiated diagonally in order to avoid any part that cannot be inspected. Note that, while this embodiment uses one X-ray source, the present invention can also be applied when using a plurality of X-ray sources. Objects can be identified with higher precision when a plurality of X-ray sources are used (more X-ray transferred images from different photographing directions).

The object identification device 200 is a computing machine (computer) capable of identifying a specific image from an X-ray transferred image, and may be a laptop computer, a server device, or an FPGA (Field-Programmable Gate Array). The object identification device 200 identifies an object in the baggage based on the X-ray transferred image captured with the X-ray inspection device 100, and displays the determination result and the like on the display terminal 300 (screen display). Details of the object identification device 200 will be explained later with reference to FIG. 2 to FIG. 4.

The display terminal 300 is a display device, and may be a CRT display, a liquid crystal display, a plasma display, an organic EL display or the like. Moreover, the display terminal 300 may also be a smartphone, a tablet terminal, or a laptop computer. The display terminal 300 is used for displaying the X-ray transferred image that was captured by the X-ray inspection device 100, and displaying the identification result of the object identification device 200.

Figure 2:
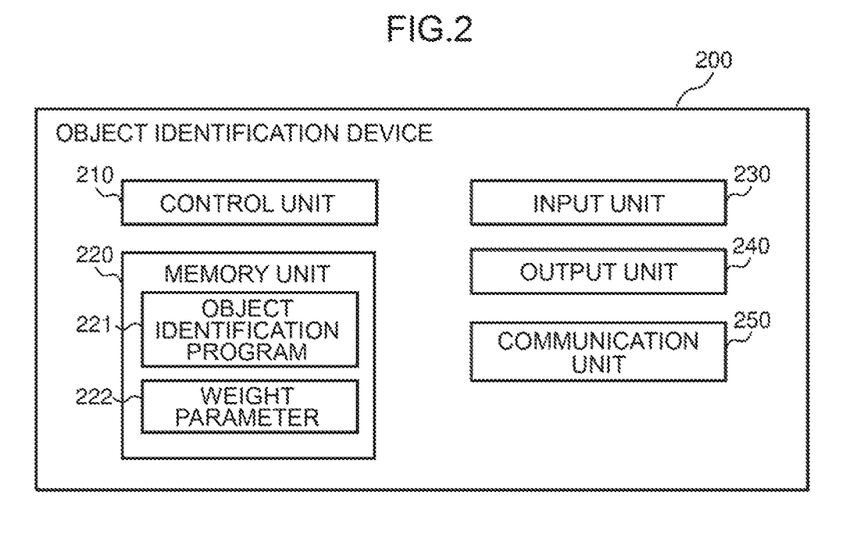
FIG. 2 is a diagram showing an example of the configuration of the object identification device according to the first embodiment.

FIG. 2 is a diagram showing an example of the configuration of the object identification device 200. The object identification device 200 is configured by including a control unit 210, a memory unit 220, an input unit 230, an output unit 240, and a communication unit 250.

The control unit 210 is, for example, a CPU (Central Processing Unit), and performs various types of control. The memory unit 220 is a RAM (Random Access Memory), a ROM (Read Only Memory), an HDD (Hard Disk Drive) or the like, and is used for storing various types of information (object identification program 221, weight parameter 222 and the like). The input unit 230 is a keyboard, a mouse or the like, and is used for inputting various types of information. The output unit 240 is a display device that is similar to the display terminal 300, and is used for displaying various types of information (X-ray transferred image captured by the X-ray inspection device 100, identification result of the object identification device 200, and so on). The communication unit 250 is configured, for example, from an NIC (Network Interface Card), and is used for performing protocol control during the communication with the X-ray inspection device 100.

The functions (pixel group extraction unit, determination unit, display processing unit and the like) of the object identification device 200 may be realized, for example, by the CPU reading a program (for example, object identification program 221) stored in the ROM into the RAM and executing such program (software), realized with hardware such as a dedicated circuit, or realized based on a combination of software and hardware.

The weight parameter 222 is a parameter for identifying the object. Here, the object includes animals and plants in addition to goods. For example, the animals and plants in which international transactions are restricted under the Washington Convention correspond to the foregoing animals and plants. In particular, with regard to animals, without limitation to a state of being alive, parts in which shapes such as their skeletal structure can be identified, even after their death, shall be included in the target of identification. Moreover, goods do not refer to abstract items that represent all commodities (products), and refer to specific individual commodities (to put it differently, available commodities) of manufactures (brands) that are being circulated in the market. Note that general names, and not specific product names, will be used in the following explanation due to circumstances of this specification.

A plurality of weight parameters 222 are provided for each object and for each photographing direction (imaging direction) of the object. For example, when the object is a fountain pen, the fountain pen is photographed one degree at a time in the horizontal direction and one degree at a time in the up-down direction (vertical direction), and a plurality of weight parameters 222 corresponding to each of the X-ray transferred images of 129,600 (=360×360) cuts are provided. Note that the degree of cutting the X-ray transferred image is not limited to one degree at a time, and many be multiple degrees such as two degrees at a time. Moreover, the angle unit is not limited to degrees (°), and a radian (rad) may also be applied. In the foregoing case, the level of cutting may be a prescribed radian at a time based on the ratio of the circumference of a circle (π).

Moreover, a plurality of weight parameters 222 may be provided for each object and for each most notable characteristic site of the object and for each photographing direction of the characteristic site in addition to, or in substitute for, the photographing direction of the object. For example, when the object is a fountain pen, the notable characteristic sites of a fountain pen are the pen point, clip, cap, trunk, neck and celestial crown, and the most notable characteristic site differs depending on the fountain pen, and is decided by the administrator, system or the like. Note that the most notable characteristic site may be one characteristic site, or combination of a plurality of characteristic sites.

Note that, while an example of the optimization of the weight parameters 222 will be described later with reference to FIG. 6 and FIG. 7, the weight parameters 222 are a data group which is obtained, with regard to mapping function elements which execute multi-input single-output mappings of performing, and outputting, nonlinear threshold processing to a sum obtained by inputting a plurality of pixel groups configuring an image area including characteristics of a shape of at least a part of the object for each of the image groups and multiplying each weight parameter assigned thereto 222 among a plurality of X-ray transferred images generated by X-ray imaging the object from an angle of an arbitrary i direction (integer which satisfies 1≤i≤n), by executing the series of mappings until the mappings converge to a final single mapping function element for deciding whether it corresponds to the object while interconnecting inputs/outputs of the mapping function elements, and thereafter respectively optimizing all of the weight parameters 222 based on an output of the obtained single mapping function element.

Here, a part of the functions of the object identification device 200 may be realized with another computer capable of communicating with the object identification device 200. Moreover, for example, when the object identification device 200 is included in the X-ray inspection device 100, the input unit 230, the output unit 240, and the communication unit 250 do not need to be provided. Moreover, for example, one of either the output unit 240 or the display terminal 300 of the object identification device 200 does not need to be provided.

Figure 3:
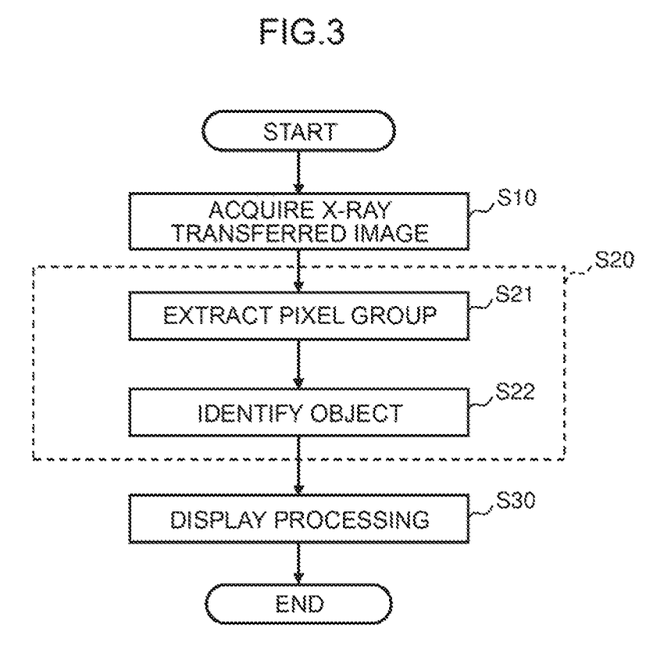
FIG. 3 is a diagram showing an example of the flowchart of the series of processing to be executed by the object identification device according to the first embodiment.

FIG. 3 is a diagram showing an example of the flowchart of the series of processing to be executed by the object identification device 200.

In step S10, the pixel group extraction unit receives (acquires) an X-ray transferred image from the X-ray inspection device 100.

Figure 4:
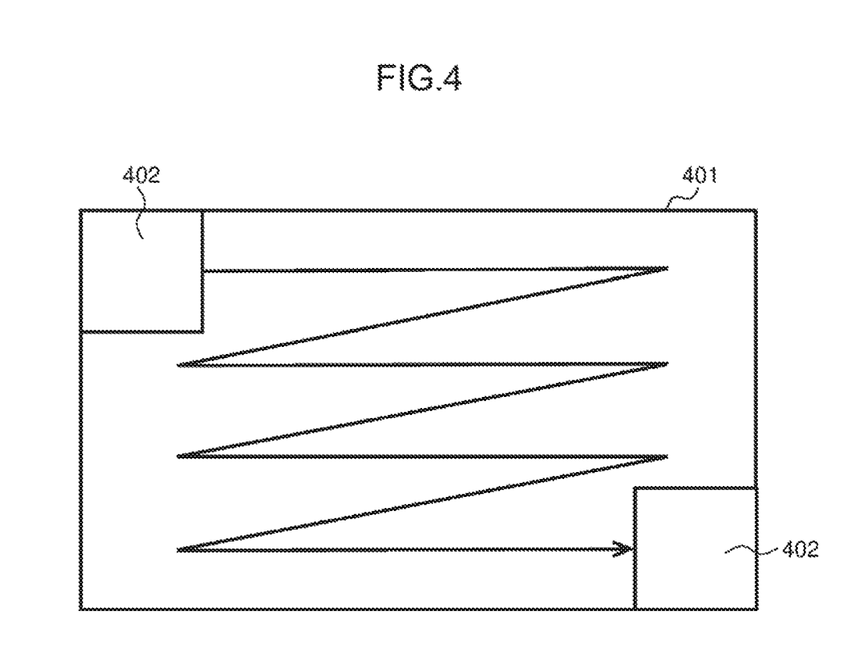
FIG. 4 is a diagram showing an example of the scanning method of the X-ray transferred image according to the first embodiment.

In step S20, object identification processing is performed. Since objects are housed in various parts within the baggage, in the object identification processing, as shown in FIG. 4, an image area 402 corresponding to a predetermined object (object with optimized weight parameters) configured from a plurality of pixel groups is scanned, one pixel at a time, in the horizontal direction and the vertical direction in the X-ray transferred image 401, and whether or not a predetermined object is included is determined regarding the image area 402 in each scanning position. Note that the image area 402 is an image area corresponding to the predetermined object, and the size of the image area may differ for each object, and for each photographing direction.

Figure 5:
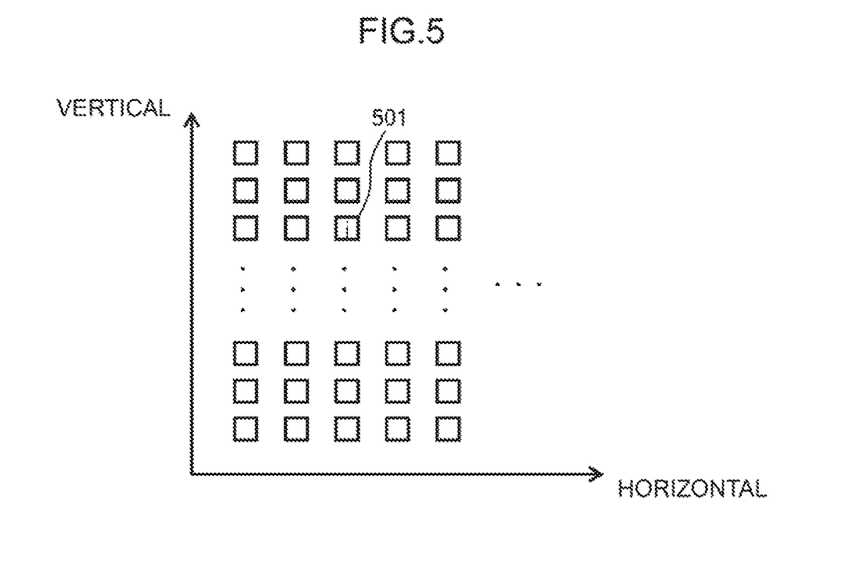
FIG. 5 is a diagram showing an example of the X-ray transferred image of one object according to the first embodiment.

Moreover, since objects are housed in various orientations within the baggage, as shown in FIG. 5, whether or not a predetermined object is included in the X-ray transferred image of a plurality of cuts is sequentially determined for one object.

Moreover, when the object recognition processing performed to one object is completed, the object recognition processing is performed to the next object. The processing contents of the object recognition processing will be explained in step S21 and step S22 by taking as an example the processing of the image area of one scanning position in the X-ray transferred image 501 of cuts in the i direction of one object.

In step S21, the pixel group extraction unit extracts a pixel group of the image area of one scanning position from the X-ray transferred image acquired in step S10. For example, the pixel group extraction unit scans the X-ray transferred image 501 obtained from the X-ray inspection device 100 in units of image areas, and a plurality of pixel groups which may include the characteristics of a shape of at least a part of the object are extracted.

In step S22, the determination unit determines whether or not a predetermined object is included in the baggage. For example, the determination unit determines whether the item to be inspected (a plurality of pixel groups) corresponds to a predetermined object by using the respective weight parameters 222 based on the data group read from the memory unit 220 regarding a plurality of pixel groups extracted by the pixel group extraction unit, and executing all of the series of mappings related to the angle of the i direction.

Here, the determination unit may use the weight parameter 222 of the image of the overall object, use the weight parameter 222 of the image of the most notable characteristic site of the object, or use both of these weight parameters 222. For example, by using the weight parameter 222 of the image of the most notable characteristic site of the object, the object can be identified easily only from the most notable characteristic site for identifying the object (for instance, pen point of a fountain pen) without having to target the entire object. Moreover, since the most notable characteristic site, and not the overall object, becomes the target of processing, the throughput can be reduced. Moreover, for example, by using both of these weight parameters 222, objects can be identified with higher precision.

Moreover, in step S22, while the determination unit determined whether the item to be inspected corresponds to a predetermined object based on the weight parameter 222 of the X-ray transferred image 501 of cuts of one object in the i direction, the present invention is not limited thereto. For example, whether or not the item to be inspected corresponds to a predetermined object may also be determined according to the determination result based on the weight parameter 222 of cuts of one object in an (i−k) direction, the determination result based on the weight parameter 222 of cuts of one object in an i direction, and the determination result based on the weight parameter 222 of cuts of one object in an (i+k) direction. In the foregoing case, the determination unit determines that the item to be inspected corresponds to a predetermined object when it is determined that a predetermined object is included in all determination results. Note that k is an integer which satisfies 1≤k<i. Moreover, since the correlation of X-ray transferred images from a nearly approximate angular direction is high, the object can be identified easily and with high precision by using the weight parameters 222 of the adjacent X-ray transferred images.

In step S30, the display processing unit performs display processing, and then ends the series of processing. For example, in the display processing, the display processing unit colors the item to be inspected within the X-ray transferred image displayed on the display unit in an identifiable manner when the determination unit determines that the item to be inspected corresponds to the object. As a result of displaying only the item to be inspected in a specific color within the overall image, the item to be inspected can be easily recognized by the inspector.

Figure 6:
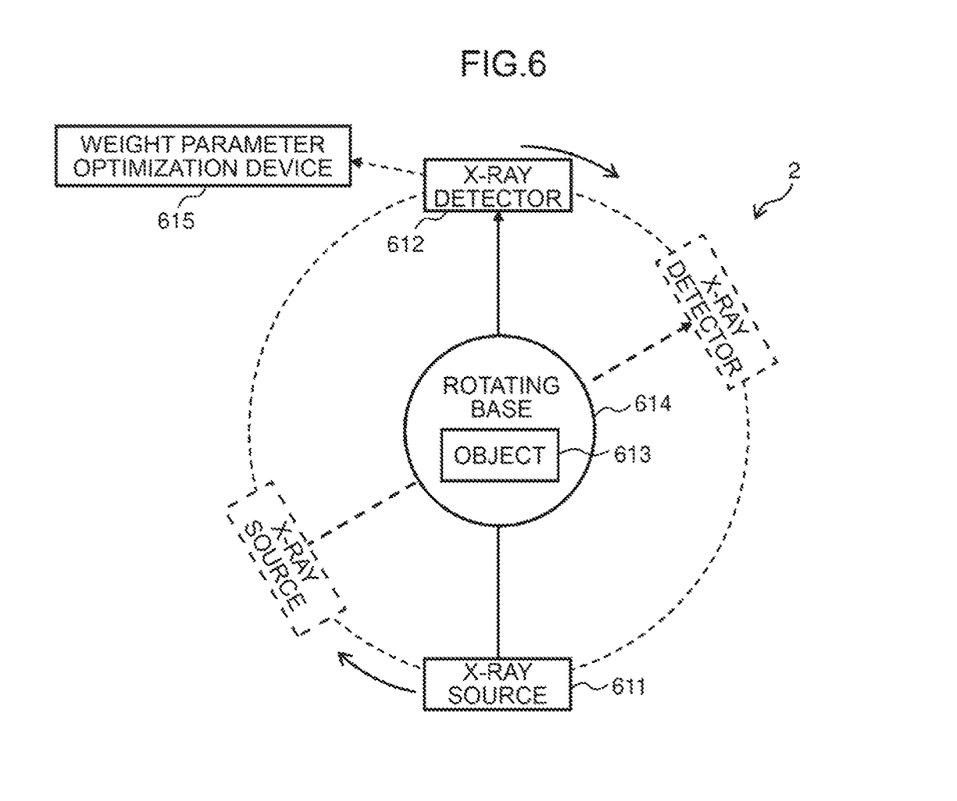
FIG. 6 is a diagram showing an example of the configuration of the weight parameter optimization system according to the first embodiment.

FIG. 6 is a diagram showing an example of the configuration of the weight parameter optimization system 2. The weight parameter optimization system 2 is configured by including an X-ray source 611 which irradiates X-rays, an X-ray detector 612 which measures the transmission amount of X-rays, a rotating base 614 for mounting the object 613, and a weight parameter optimization device 615 which generates the weight parameter 222.

With the weight parameter optimization system 2, the X-ray source 611 and the X-ray detector 612 form a pair and can be rotated 360 degrees in the up-down direction (vertical direction) at a predetermined angle at a time (for example, one degree at a time), and the rotating base 614 can be rotated 360 degrees in the horizontal direction at a predetermined angle at a time (for example, one degree at a time). Based on the foregoing configuration, an X-ray transferred image of a predetermined number of cuts (for example, 129,600 cuts) of the object mounted on the rotating base 614 can be acquired.

The weight parameter optimization device 615 is a computing machine (computer), and may be a laptop computer, a server device or the like. The weight parameter optimization device 615 optimizes the weight parameter 222 for identifying the object based on a plurality of input data (data including the input image and label).

Figure 7:
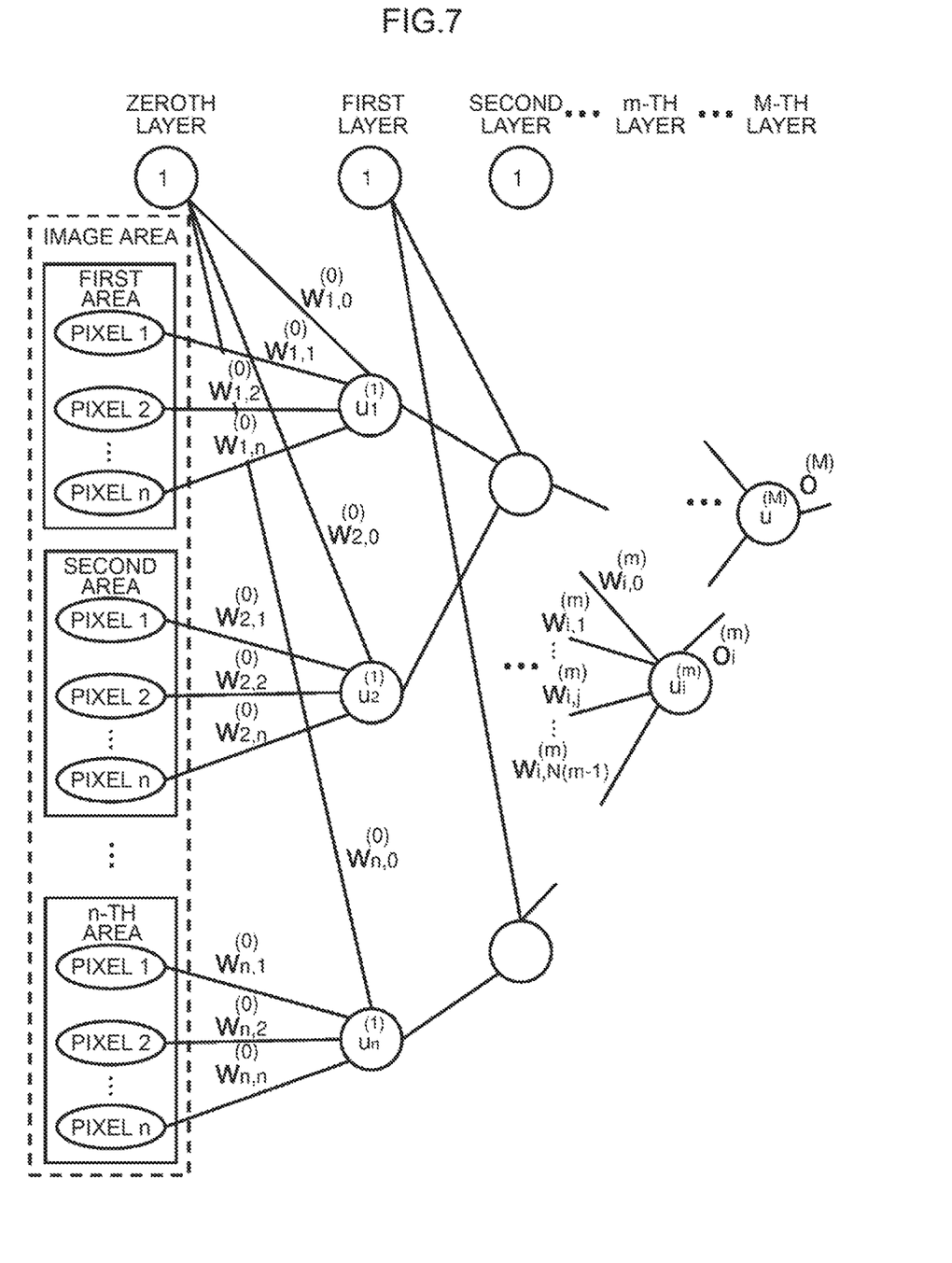
FIG. 7 is a diagram showing an example of the network according to the first embodiment.

FIG. 7 is a diagram showing an example of the network for explaining the optimization of the weight parameter 222. In FIG. 7, the number of layers excluding the input layer is indicated as "M", the input layer is the zeroth layer, the next layer is the first layer, . . . , and the output layer is the M-th layer.

In this embodiment, the number of mapping function elements of an arbitrary m-th layer is indicated as $N^{(m)}$. For example, the number of mapping function elements of the second layer will be $N^{(2)}$. Moreover, the output value of the i-th mapping function element of the m-th layer is indicated as $O^{(m)}_i$. Moreover, among the weights linked to the i-th mapping function element of the m-th layer, the j-th weight is indicated as $w^{(m)}_{i,j}$. Moreover, since the input value to the i-th mapping function element of the m-th layer is the output value of the immediately preceding layer, this will be 1, $O^{(m-1)}_1$, $O^{(m-1)}_2$, . . . The total value obtained by multiplying these input values by the weight (weight parameter 222) is indicated as $u^{(m)}_i$.

With this network, when the X-ray transferred image (for example, color concentration of each pixel in the image area) of the X-ray inspection device 100 is input to the input layer, it is propagated to the first layer, the second layer, . . . while multiplying the weight, and the output value y is output from the output layer. Meanwhile, when updating (optimizing) the weight, the calculation of the renewal of weight of the output layer is foremost performed, and, while propagating a part of the calculation result thereof, calculation is performed in order in the reverse direction such as (M−1)-th layer, (M−2)-th layer, . . . .

For example, with this network, the following is used as the output error E.

$$E = \tfrac{1}{2}(y-t)^2 \quad \text{[Math 1]}$$

Here, y is the output value ($=O^{(M)}$) of the output layer, and t is the label of the input data. In other words, "y−t" indicates the difference between the ideal output value and the actual output value.

Thus, the updating formula of the i-th weight of the m-th layer based on the gradient descent method will be as follows.

$$w^{(m)}_{i,j} \leftarrow w^{(m)}_{i,j} - \rho \delta^{(m)}_i O^{(m-1)}_j \quad \text{[Math 2]}$$

Here, with this network, since a multi-input single-output was adopted, $\delta^{(m)}_i$ is defined as follows.

$$\delta^{(m)}_i = \begin{cases} (O^{(m)}_i - t_i) f'(u^{m}_i) & (m = M) \\ (O^{(m)}_i - t_i) f'(u^{m}_i) w^{(m)}_i & (m < M) \end{cases} \quad \text{[Math 3]}$$

Note that f' is a derived function of the activating function f. As the activating function f, a suitable nonlinear activating function (nonlinear threshold processing) such as the Sigmoid function, the hyperbolic tangent function, the ramp function (Rectified Linear Unit), the Softmax function, or the Gaussian function may be adopted.

The weight parameter optimization device 615 uses the foregoing updating formula and updates the weight. More specifically, the weight parameter optimization device 615 foremost randomly initializes all weights. Subsequently, the weight parameter optimization device 615 inputs the input data and calculates the output error E until the optimization is completed, calculates the updating quantity of all weights in order from the output layer according to the foregoing updating formula, applies the calculated updating quantity to all weights, and repeats the foregoing processes.

Based on the foregoing processing, the weight parameter 222 of the X-ray transferred image of one object in one direction is optimized. Furthermore, the weight parameter 222 is optimized for one object in each of all directions (number of predetermined cuts). Moreover, similar processing is performed for available objects to be registered, and the weight parameter 222 is prepared (stored in the memory unit 220).

According to this embodiment, during the actual X-ray imaging of the item to be inspected, there is no need to compare the item to be inspected with standard data such as the template image that is registered in a database in advance, and the object can be easily identified irrespective of the X-ray imaging direction merely by performing computation using the weight parameters read from a memory unit (memory) if the item to be inspected corresponds to an object that was stored in advance.

Consequently, it is possible to reduce the inspector's trouble of visually confirming whether the item to be inspected is an object recognized in advance during the baggage inspection, and thereby reduce the inspector's workload.

(2) Second Embodiment

Figure 8:
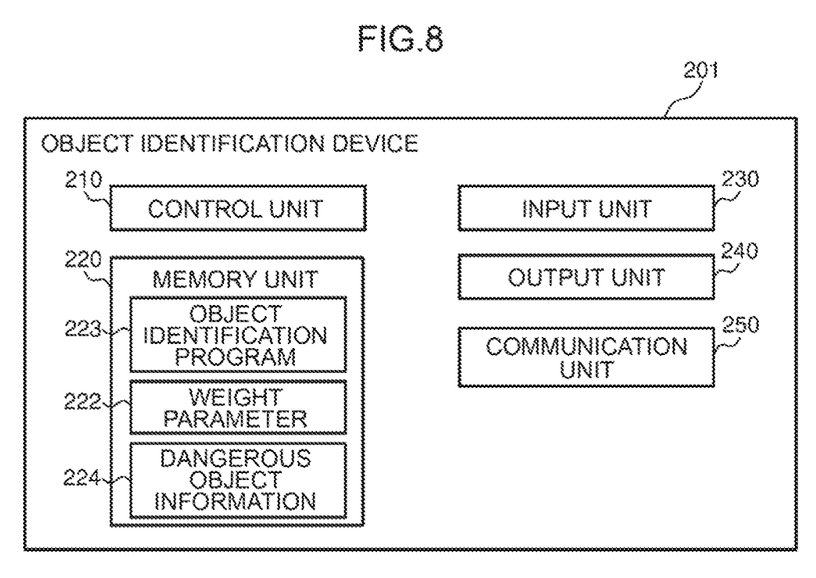
FIG. 8 is a diagram showing an example of the configuration of the object identification device according to the second embodiment.

FIG. 8 is a diagram shown an example of the configuration of the object identification device 201 according to this embodiment. The main difference in comparison to the object identification device 200 of the first embodiment is in that existence of dangerous objects (cutlery, items that could be used as weapons, sharp objects or the like) is determined, and the determination result is output. Any configuration that is the same as the first embodiment is given the same reference numeral, and the explanation thereof will be omitted as appropriate.

The object identification device 201 identifies (determines) what kind of object (item to be inspected) is included in an inspection item such as baggage based on the weight parameters optimized by the weight parameter optimization system 2 and the X-ray transferred image obtained by the inspection item being irradiated with X-rays, determines whether any dangerous object is included in the baggage, and outputs the determination result.

The object identification device 201 additionally comprises a warning unit, and the warning unit may be realized, for example, by a CPU reading a program (for example, object identification program 223) stored in the ROM into the RAM and executing such program (software), realized with hardware such as a dedicated circuit, or realized based on a combination of software and hardware.

The dangerous object information 224 is information indicating whether the output value (identified object) calculated based on the weight parameter 222 stored in the memory unit 220 is a dangerous object. With the object identification device 200, the object, one of more weight parameters 222 pertaining to the object, and the dangerous object information 224 indicating whether the object is a dangerous object are associated and stored in the memory unit 220. Note that another data configuration may also be adopted such as where the dangerous object information 224 is stored in the memory unit 220 only when the object is a dangerous object.

Note that, while not illustrated, the X-ray inspection device 100 may additionally comprise a mechanism which gives a feedback to the inspector to the effect that a dangerous object is included in the baggage (warning mechanism of illuminating a lamp, outputting sound, or stopping the drive mechanism of a belt conveyer or the like that is transporting the baggage within the X-ray inspection device 100).

Figure 9:
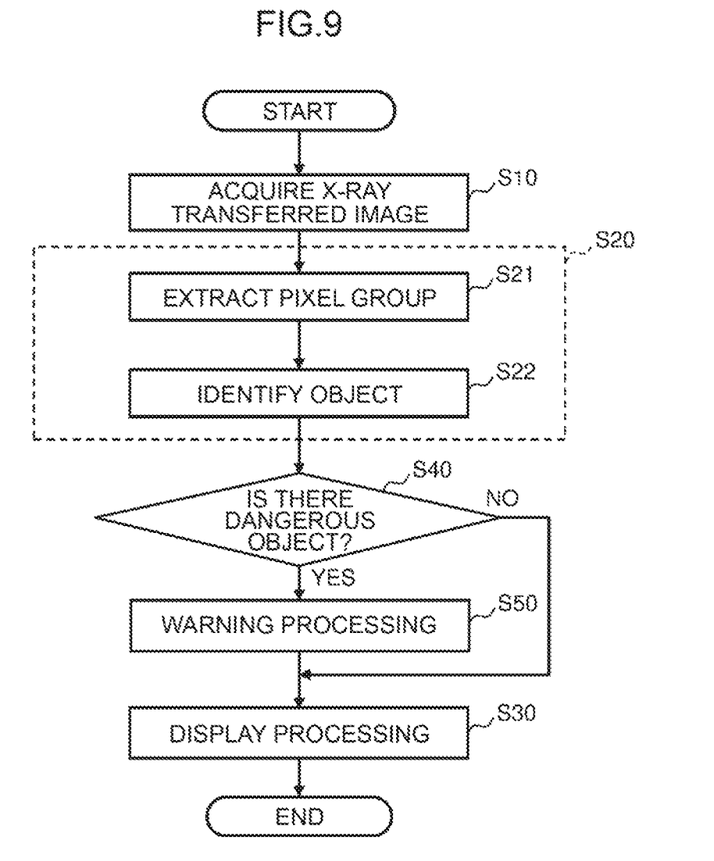
FIG. 9 is a diagram showing an example of the flowchart of the series of processing to be executed by the object identification device according to the second embodiment.

FIG. 9 is a diagram showing an example of the flowchart of the series of processing to be executed by the object identification device 201 according to the second embodiment.

In step S40, the determination unit determines whether a dangerous object is included in the baggage based on the dangerous object information 224. The determination unit proceeds to the processing of step S50 upon determining that a dangerous object is included in the baggage, and proceeds to the processing of step S30 upon determining that a dangerous object is not included in the baggage.

In step S50, the warning unit performs warning processing. For example, when the determination unit determines that the item to be inspected corresponds to the object and additionally determines that the object corresponds to a dangerous object of the dangerous object information 224 stored in the memory unit 220, the warning unit sends an instruction to the X-ray inspection device 100 to issue a warning, and a warning is issued based on the warning mechanism of the X-ray inspection device 100 of outputting sound and/or emitting light circumferentially. The inspector can easily recognize a dangerous object based on the foregoing warning. Note that the object identification device 201 may comprise the warning mechanism so that the object identification device 201 issues the warning.

Moreover, the warning unit may instruct the display unit to display, together with or in substitute for the warning issued by the X-ray inspection device 100, the item to be inspected within the X-ray transferred image displayed on the display unit (the display terminal 300 and/or the output unit 240) in a predetermined display color and a display pattern. According to the foregoing processing, it is possible to reduce the risk of the inspector overlooking the existence of a dangerous object.

(3) Other Embodiments

While the foregoing embodiments explained a case of applying the present invention to an object identification system, the present invention is not limited thereto, and may be broadly applied to various other types of systems and object identification methods.

Moreover, while the foregoing embodiments explained a case of taking the X-ray inspection device 100 as an example for distinguishing the inspection based on a transferred image, the present invention is not limited thereto. For example, it is also possible to adopt a back scattered radiation inspection device, in addition to or in substitute for the X-ray inspection device 100, which captures an image of the amount of back scattered radiation (Compton scattered radiation) generated from the X-rays with which the item to be inspected was irradiated. Back scattered radiation is characterized in that the scattered radiation dosage from a material having a small atomic number such as resin increases, and with a back scattered radiation inspection device it is possible to obtain an image that is different from a transferred image. For example, by concurrently using the X-ray inspection device 100 and a back scattered radiation inspection device, it is possible to detect an inspection item such as resin that is hidden in metals.

Moreover, while the foregoing embodiments explained a case of the X-ray inspection device 100 acquiring one type of X-ray transferred image, the present invention is not limited thereto, and the X-ray inspection device 100 may also acquire a plurality of types of X-ray transferred images (for example, image indicating details of information of a hard material, and image indicating details of information of a soft material). As a result of using a plurality of types of X-ray transferred images, objects can be identified with higher precision.

Moreover, in the foregoing explanation, information such as programs, tables and files that realize the respective functions may be stored in a memory, a storage device such as a hard disk or SSD (Solid State Drive), or a recording medium such as an IC card, SD card, or DVD. Moreover, in the appended drawings, control lines and information lines are illustrated to the extent required for the explanation, and not all control lines and information lines required for the product are necessarily illustrated.

Moreover, the foregoing configuration may be changed, rearranged, combined or omitted as needed to the extent that it does not exceed the subject matter of the present invention.

REFERENCE SIGNS LIST

1 . . . object identification system, 2 . . . weight parameter optimization system, 100 . . . X-ray inspection device, 200 . . . object identification device, 210 . . . control unit, 220 . . . memory unit, 221 . . . object identification program, 222 . . . weight parameter, 224 . . . dangerous object information, 230 . . . input unit, 240 . . . output unit, 250 . . . communication unit, 300 . . . display terminal, 615 . . . weight parameter optimization device.

The invention claimed is:

1. An object identification device which identifies a specific object from an X-ray transferred image, the object identification device comprising:
a memory unit which stores a data group which is obtained, with regard to mapping function elements which execute multi-input single-output mappings of performing, and outputting, nonlinear threshold processing to a sum obtained by inputting a plurality of pixel groups configuring an image area including characteristics of a shape of at least a part of the object for each of the image groups and multiplying each weight parameter assigned thereto among a plurality of X-ray transferred images generated by X-ray imaging the object from an angle of an arbitrary i direction (integer which satisfies $1 \le i \le n$), by executing series of mappings until mappings converge to a final single mapping function element for deciding whether it corresponds to the object while interconnecting inputs/outputs of the mapping function elements, and thereafter respectively optimizing all of weight parameters based on an output of the obtained single mapping function element;
a processor coupled to a memory unit to permit the processor to function as:
a pixel group extraction unit which scans, in units of the image area, an X-ray transferred image obtained from an imaging unit which performs X-ray imaging to an item to be inspected that is supplied, and extracts a plurality of pixel groups including characteristics of a shape of at least a part of the item to be inspected; and
a determination unit which determines, with regard to the plurality of pixel groups extracted by the pixel group extraction unit, whether the item to be inspected corresponds to the object by executing all of the series of mappings related to an angle of an n direction by using each of the weight parameters based on the data group read from the memory unit.

2. The object identification device according to claim 1, wherein the determination unit determines whether the item to be inspected corresponds to the object based on a result of executing the series of mappings regarding an X-ray transferred image obtained by imaging the object from an angle of an arbitrary i direction, an X-ray transferred image obtained from an angle of an (i–k) direction (integer which satisfies $1 \le k < i$), and an X-ray transferred image obtained from an angle of an (i+k) direction.

3. The object identification device according to claim 1, wherein the determination unit determines whether the item to be inspected corresponds to the object by using the weight parameters based on a plurality of pixel groups representing a most notable characteristic site for identifying the object among sites of the object and executing all of the series of mappings upon executing the series of mappings for an X-ray transferred image obtained by imaging the object from an angle of an arbitrary i direction.

4. The object identification device according to claim 1, further comprising:
a display unit which displays a screen of an X-ray transferred image that was subject to X-ray imaging of the imaging unit,
wherein, when the determination unit determines that the item to be inspected corresponds to the object, the display unit colors the item to be inspected in an identifiable manner within the X-ray transferred image displayed on the display unit.

5. The object identification device according to claim 1, wherein, with regard to the object, any object which corresponds to a dangerous object is registered in the memory unit in advance, and
wherein the processor further functions as
a warning unit which issues a warning by outputting sound and/or emitting light circumferentially when the determination unit determines that the item to be inspected corresponds to the object and additionally determines that the object corresponds to the dangerous object stored in the memory unit.

6. The object identification device according to claim 5, further comprising:
a display processing unit which displays the item to be inspected within the X-ray transferred image displayed on the display unit in a predetermined display color and a display pattern together with, or in substitute for, the warning issued by the warning unit.

7. An object identification method which identifies a specific object from an X-ray transferred image, the object identification method comprising:
a first step of storing a data group which is obtained, with regard to mapping function elements which execute multi-input single-output mappings of performing, and outputting, nonlinear threshold processing to a sum obtained by inputting a plurality of pixel groups configuring an image area including characteristics of a shape of at least a part of the object for each of the image groups and multiplying each weight parameter assigned thereto among a plurality of X-ray transferred images generated by X-ray imaging the object from an angle of an arbitrary i direction (integer which satisfies $1 \le i \le n$), by executing series of mappings until mappings converge to a final single mapping function element for deciding whether it corresponds to the object while interconnecting inputs/outputs of the mapping function elements, and thereafter respectively optimizing all of weight parameters based on an output of the obtained single mapping function element;
a second step of scanning, in units of the image area, an X-ray transferred image obtained from an imaging unit which performs X-ray imaging to an item to be inspected that is supplied, and extracting a plurality of pixel groups including characteristics of a shape of at least a part of the item to be inspected; and
a third step of determining, with regard to the plurality of pixel groups that were extracted, whether the item to be inspected corresponds to the object by executing all of the series of mappings related to an angle of an n direction by using each of the weight parameters based on the data group stored in the first step.

8. The object identification method according to claim 7, wherein, in the third step, whether the item to be inspected corresponds to the object is determined based on a result of executing the series of mappings regarding an X-ray transferred image obtained by imaging the object from an angle of an arbitrary i direction, an X-ray transferred image obtained from an angle of an (i–k) direction (integer which satisfies $1 \le k < i$), and an X-ray transferred image obtained from an angle of an (i+k) direction.

9. The object identification method according to claim 7, wherein, in the third step, whether the item to be inspected corresponds to the object is determined by using the weight parameters based on a plurality of pixel groups representing a most notable characteristic site for identifying the object among sites of the object and executing all of the series of mappings upon executing the series of mappings for an X-ray transferred image obtained by imaging the object from an angle of an arbitrary i direction.

10. The object identification method according to claim 7, wherein a screen of an X-ray transferred image that was subject to X-ray imaging of the imaging unit is displayed on a display unit in advance, and
   wherein, when it is determined that the item to be inspected corresponds to the object in the third step, the item to be inspected is colored in an identifiable manner within the X-ray transferred image displayed on the display unit.

11. The object identification method according to claim 7, wherein, with regard to the object, any object which corresponds to a dangerous object is registered in the first step in advance, and
   wherein a warning is issued by outputting sound and/or emitting light circumferentially when it is determined that the item to be inspected corresponds to the object in the third step and additionally determined that the object corresponds to the dangerous object stored in the first step.

12. The object identification method according to claim 11, wherein the item to be inspected within the X-ray transferred image displayed on a display unit is displayed in a predetermined display color and a display pattern together with, or in substitute for, the warning.

* * * * *